United States Patent
Gustafson et al.

(10) Patent No.: US 11,739,644 B2
(45) Date of Patent: Aug. 29, 2023

(54) TURBINE STAGE PLATFORM WITH ENDWALL CONTOURING INCORPORATING WAVY MATE FACE

(71) Applicant: Siemens Energy Global GmbH & Co. KG, Munich (DE)

(72) Inventors: Ross Gustafson, Charlotte, NC (US); Li Shing Wong, Oviedo, FL (US); Farzad Taremi, Palm Beach Gardens, FL (US)

(73) Assignee: SIEMENS ENERGY GLOBAL GMBH & CO. KG, Munich (DE)

( * ) Notice: Subject to any disclaimer, the term of this patent is extended or adjusted under 35 U.S.C. 154(b) by 61 days.

(21) Appl. No.: 16/982,962

(22) PCT Filed: Mar. 30, 2018

(86) PCT No.: PCT/US2018/025308
§ 371 (c)(1),
(2) Date: Sep. 21, 2020

(87) PCT Pub. No.: WO2019/190539
PCT Pub. Date: Oct. 3, 2019

(65) Prior Publication Data
US 2021/0017862 A1    Jan. 21, 2021

(51) Int. Cl.
*F01D 5/14*    (2006.01)
(52) U.S. Cl.
CPC .................... *F01D 5/143* (2013.01)
(58) Field of Classification Search
CPC ....... F01D 5/143; F01D 9/041; F05D 2240/80
See application file for complete search history.

(56) References Cited

U.S. PATENT DOCUMENTS

| | | |
|---|---|---|
| 7,887,297 B2 | 2/2011 | Allen-Bradley et al. |
| 8,459,956 B2 | 6/2013 | Pandey et al. |
| 2007/0258819 A1* | 11/2007 | Allen-Bradley ........ F01D 5/145 |
| | | 416/193 A |

(Continued)

FOREIGN PATENT DOCUMENTS

EP    3045662 A1    7/2016

OTHER PUBLICATIONS

PCT International Search Report and Written Opinion of International Searching Authority dated Oct. 12, 2018 corresponding to PCT International Application No. PCT/US2018/025308 filed Mar. 30, 2018.

*Primary Examiner* — Brian P Wolcott
*Assistant Examiner* — Jesse M Prager

(57) ABSTRACT

A turbine stage includes a first airfoil and a second airfoil extending respectively from a first platform and a second platform that form an endwall for a flow passage. The endwall has a nominal surface that is axisymmetric about an axis of the turbine stage. The endwall further includes at least one contoured region that is non-axisymmetric with respect to the axis. The at least one contoured region extends from the first platform to the second platform across a platform splitline. The global maximum variation in elevation $\Delta EW$ of the endwall is at least 3% of an axial chord length L of the airfoils on the endwall. The maximum variation in elevation $\Delta MF$ at the mate facea of the platforms lies in the range 15-60% $\Delta EW$.

5 Claims, 2 Drawing Sheets

(56) References Cited

U.S. PATENT DOCUMENTS

| | | | |
|---|---|---|---|
| 2010/0080708 A1* | 4/2010 | Gupta | F01D 9/04 416/223 A |
| 2010/0158696 A1* | 6/2010 | Pandey | F01D 5/145 416/243 |
| 2010/0284818 A1* | 11/2010 | Sakamoto | F01D 5/145 416/241 R |
| 2013/0224027 A1* | 8/2013 | Barr | F01D 5/143 416/193 A |
| 2013/0251520 A1* | 9/2013 | Barr | F01D 5/143 415/208.2 |
| 2015/0107265 A1* | 4/2015 | Smith | F01D 5/143 60/805 |

* cited by examiner

TURBINE STAGE PLATFORM WITH ENDWALL CONTOURING INCORPORATING WAVY MATE FACE

BACKGROUND

1. Field

The present invention relates to gas turbine engines, and in particular, to stationary turbine vanes and rotating turbine blades having non-axisymmetric contoured endwalls.

2. Description of the Related Art

In a turbomachine, such as a gas turbine engine, air is pressurized in a compressor section and then mixed with fuel and burned in a combustor section to generate hot combustion gases. The working medium, comprising hot combustion gases is expanded within a turbine section of the engine where energy is extracted to power the compressor section and to produce useful work, such as turning a generator to produce electricity. The working medium travels through a series of turbine stages within the turbine section. A turbine stage may include a row of stationary vanes, followed by a row of rotating blades, where the blades extract energy from the hot combustion gases for providing output.

Each rotating blade typically includes an attachment adapted to fit in one of the slots, a platform and an airfoil. When the blades are installed in the hub the platforms cooperate with each other to partially define the radially inner boundary of an annular working medium flowpath. The airfoils span across the flowpath so that the airfoil tips are in close proximity to a stationary component, such as a turbine ring segment. The ring segment circumscribes the blade array to partially define the radially outer boundary of the flowpath. Alternatively, a blade may have a radially outer platform or shroud that partially defines the radially outer boundary of the flowpath. The radially inner platform and the radially outer platform (if present) define flowpath endwalls.

Each stationary vane typically has radially inner and outer platforms that partially define the radially inner and outer flowpath boundaries. An airfoil spans across the flowpath from the inner platform to the outer platform. The radially inner and outer platforms of the vanes also define flowpath endwalls.

During engine operation, a stream of working medium fluid flows through the turbine flowpath. Near the endwalls, the fluid flow is dominated by a vortical flow structure known as a horseshoe vortex. The vortex forms as a result of the endwall boundary layer which separates from the endwall as the fluid approaches the airfoils. The separated fluid reorganizes into the horseshoe vortex. There is a high loss of efficiency associated with the vortex. The loss is referred to as "secondary" or "endwall" loss.

To address secondary losses, it is known to provide a non-axisymmetric contoured surface to the blade and vane endwalls. Contoured endwall surfaces may present mechanical challenges, particularly at the mate faces of adjacent platforms.

SUMMARY

Briefly, aspects of the present invention relate to improvements in contouring of endwalls to achieve manufacturing feasibility while realizing performance benefit.

According to an aspect of the present invention, a turbine stage is provided. The turbine stage comprises a first airfoil extending from a first platform and a second airfoil spaced circumferentially from the first airfoil and extending from a second platform. A flow passage of a working medium is defined between the first and second airfoils, the first and second platforms defining an endwall for said flow passage. The first and second platforms comprise respective mate faces that interface along a platform splitline. The endwall has a nominal surface that is axisymmetric about an axis of the turbine stage. The endwall further comprises at least one contoured region that is non-axisymmetric with respect to said axis. The at least one contoured region extends from the first platform to the second platform across the platform splitline. A global maximum variation in elevation $\Delta EW$ of the endwall is at least 3% of an axial chord length L of the airfoils on said endwall. A maximum variation in elevation $\Delta MF$ at any of said mate faces lies in the range 15-60% $\Delta EW$.

BRIEF DESCRIPTION OF THE DRAWINGS

The invention is shown in more detail by help of figures. The figures show specific configurations and do not limit the scope of the invention.

DETAILED DESCRIPTION

In the following detailed description of the preferred embodiment, reference is made to the accompanying drawings that form a part hereof, and in which is shown by way of illustration, and not by way of limitation, a specific embodiment in which the invention may be practiced. It is to be understood that other embodiments may be utilized and that changes may be made without departing from the spirit and scope of the present invention.

In the description and drawings, the directional axes A, R and C respectively denote an axial direction, a radial direction and a circumferential direction of a gas turbine engine.

In the description and the claims, a range is understood to include the stated boundary values. For example, the phrase "between X-Y" is understood to include the values of X and Y.

Figure 1:
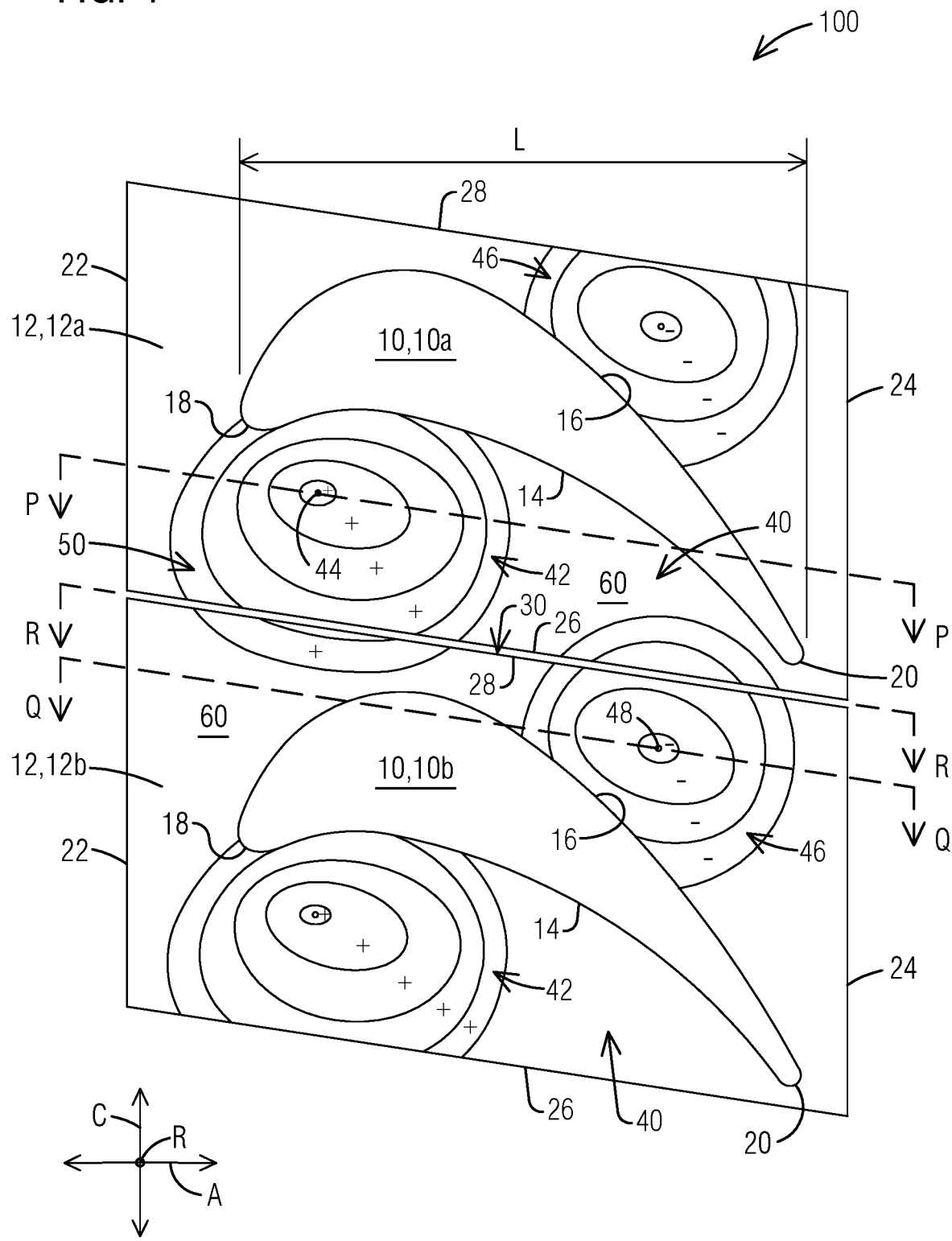
FIG. 1 illustrates a topography of a contoured endwall according to aspects of the invention.

Referring now to FIG. 1, a portion of a turbine stage 100 is illustrated according to aspects of the present invention. The turbine stage 100 includes an array of airfoils 10 positioned circumferentially spaced from each other. In FIG. 1, two circumferentially adjacent airfoils 10 are depicted, namely a first airfoil 10a and a second airfoil 10b. Each of the airfoils 10a, 10b respectively comprises a generally concave pressure side surface 14 and a generally convex suction side surface 16, which extend between a leading edge 18 and a trailing edge 20. The first and second airfoils 10a, 10b extend in a radial direction R from respective first and second platforms 12a, 12b. A flow passage 50 for a working medium is defined between the airfoils 10a, 10b. The platforms 12a, 12b form an endwall 40 which defines a radial boundary of the flow passage 50. The endwall 40 may be located either at a hub side or inner diameter of the airfoils 10a, 10b (referred to as an inner endwall) or at a tip side or outer diameter of the airfoils 10a, 10b (referred to as an outer endwall). The airfoils 10 may belong to a row of stationary turbine vanes or rotating turbine blades.

Each platform 12a, 12b comprises an upstream edge 22 and an axially opposite downstream edge 24. Each platform 12a, 12b further comprises circumferentially opposite first and second mate faces 26, 28, each extending from the upstream edge 22 to the downstream edge 24. The first mate face 26 of the first platform 12a is aligned with, and interfaces with the second mate face 28 of the second platform 12b. The interface of the mate faces 26, 28 define a platform splitline 30. The endwall 40 is an annular structure formed by a circumferential cascade of platforms 12. The endwall 40 has a nominal surface 60 that is axisymmetric about an axis of the turbine stage. In one embodiment, the nominal surface 60 of the endwall 40 may define a cylindrical surface. In another embodiment, the nominal surface 60 of the endwall 40 may define a conical surface (i.e., forming portion of a cone).

To address secondary losses due to formation of horseshoe vortices, the endwall 40 may comprise one or more contoured regions that are non-axisymmetric about the turbine axis. A contoured region may comprise, for example, a bulge or hill 42 or a depression or valley 46 on the endwall 40 in the flow passage 50 between adjacent airfoils 10a, 10b.

A bulge 42 refers to an elevation of the endwall 40 into the flow passage 50 in relation to the nominal surface 60. In the context of this description, a bulge 42 may be said to have a positive elevation. A bulge 42 may comprise a peak 44 defining a point of maximum positive elevation. From the peak 44, the bulge 42 may slope toward the nominal surface 60, before merging onto the nominal surface 60 (at zero elevation). A bulge or hill 42 is therefore understood to include a continuous area of positive elevation around (and including) the peak 44. A bulge 42 may include, for example, a convex surface. In FIG. 1, a bulge 42 is shown with positive isoclines of common elevation from an axisymmetric nominal surface 60 of the endwall 40.

A depression 46 refers to an elevation of the endwall 40 away from the flow passage 50 in relation to the nominal surface 60. In the context of this description, a depression 46 may be said to have a negative elevation. A depression 46 may comprise a bottom point 48 defining a point of maximum negative elevation. From bottom point 48, the depression 46 may slope toward the nominal surface 60, before merging into the nominal surface 60 (at zero elevation). A depression or valley 46 is therefore understood to include a continuous area of negative elevation around (and including) the bottom point 48. A depression 46 may include, for example, a concave surface. In FIG. 1, a depression 46 is shown with negative isoclines of common elevation from an axisymmetric nominal surface 60 of the endwall 40.

For increased performance benefit, a contoured region including a bulge 42 or a depression 46 may be provided over a large extent of the endwall 40. In such a case, each bulge 42 or depression 46 may be formed of a first portion located on the first platform 12a and a second portion located on the second platform 12b. The bulge 42 or depression 46 as a whole, therefore, extends from the first platform 12a to the second platform 12b across the platform splitline 30. In such a case, each of the mate faces 26, 28 may have a wavy contour (i.e., continuously varying elevation) in an axial direction A between the upstream edge 22 and the downstream edge 24.

The present inventors have recognized that the aerodynamic efficiency of the turbine stage 100 depends, in part, on the maximum variation of elevation on the contoured endwall 40. The inventors further recognized that the resultant variation in elevation at the mate faces 26, 28 may pose mechanical and heat transfer challenges, because of which wavy mate faces may be difficult to implement in practice, in spite of the theoretical performance benefits. For example, a wavy mate face would require a wavy design of the mate face seal, which would increase complexity while also increasing leaks. Another solution to implement wavy mate faces may be to mount a damper pin (for rotating blades) at an angle or at a reduced radius, which would make the platform thicker, thereby increasing mass of the component.

Aspects of the present invention provide a contoured endwall shape that allow an achievable mechanical and thermal design addressing one or more of the above mentioned technical problems, with minimum cost to the aerodynamic efficiency. In one embodiment, this is achieved by designing the endwall 40 such that a) the global maximum variation in elevation $\Delta EW$ of the endwall 40 is at least 3% of an axial chord length L of the airfoils 10a, 10b on said endwall 40, and b) the maximum variation in elevation $\Delta MF$ at any of said mate faces 26, 28 lies in the range 15-60% $\Delta EW$. The axial chord length L may be defined as the distance, in the axial direction A, between the leading edge 18 and the trailing edge 20 on the endwall 40. The feature a) ensures that a significant aerodynamic performance benefit is achieved. The feature b) ensures that the mate face variation is constrained to limit waviness to achieve a workable design, but still sufficiently high to sustain performance benefit with minimum cost to efficiency.

In a first example embodiment, an endwall 40 may comprise only one contoured region, including a bulge 42 as shown in FIG. 1 (but not the depression 46). The variation in elevation in a section P-P including the bulge 42 from the upstream edge 22 to the downstream edge 24 is shown FIG. 2. In this first example, the global maximum variation in elevation $\Delta EW_1$ of the endwall 40 is equal to the elevation or height h of the peak 44 of the bulge 42 in relation to the nominal surface 60. The elevation or height h of the peak 44 is measured normal to the nominal surface 60.

In a second example embodiment, an endwall 40 may comprise only one contoured region, including a depression 46 as shown in FIG. 1 (but not the bulge 42). The variation in elevation in a section Q-Q including the depression 46 from the upstream edge 22 to the downstream edge 24 is shown FIG. 2. In this second example, the global maximum variation in elevation $\Delta EW_2$ of the endwall 40 is equal to the elevation or depth d of the bottom point 48 of the depression 46 in relation to the nominal surface 60. The elevation or depth d of the depression 46 is measured normal to the nominal surface 60, in an opposite sense to the height h of the peak 44.

In a third example embodiment, an endwall 40 may comprise multiple contoured regions, including a first contoured region having a bulge 42 and a second contoured region having depression 46, as shown in FIG. 1. In such a case, the global maximum variation in elevation $\Delta EW$ of the endwall 40 is equal to the difference in elevation between the peak 44 of the bulge 42 and the bottom point 48 of the depression 46, in relation to the nominal surface 60. As seen from FIG. 2, in the third example, $\Delta EW_3$ is equal to the sum of the height h of the peak 44 and the depth d of the bottom point 48. In general, in an embodiment having a contoured endwall 40 with at least one bulge 42 and at least one depression 46, the maximum variation in elevation $\Delta EW$ of the endwall 40 globally may be, in particular, at least 5% of the axial chord length L, to achieve a significantly higher aerodynamic efficiency.

Figure 2:
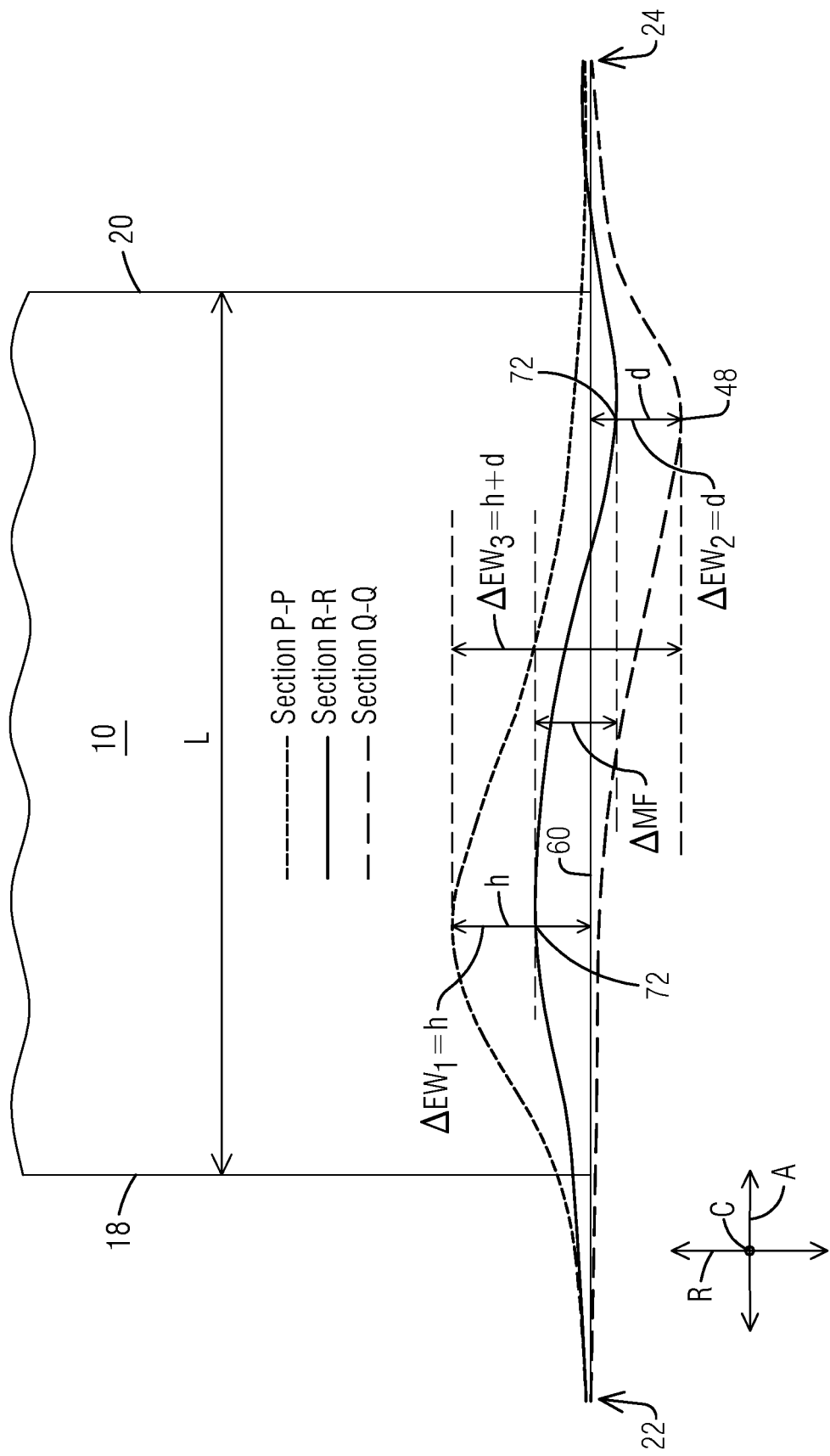
FIG. 2 is an exaggerated (not to scale) schematic diagram illustrating the variation in elevation along the sections P-P, Q-Q and R-R in FIG. 1, as projected in the axial direction.

As stated above, aspects of the present invention provide a method to maximize aerodynamic performance benefit for contoured endwalls, while maintaining mechanical feasibility. This may be achieved by constraining the maximum variation in elevation at the mate faces, as a function of the global maximum variation in elevation of the endwall. The variation in elevation in a section R-R including a mate face from the upstream edge 22 to the downstream edge 24 is shown in FIG. 2. A maximum variation in elevation ΔMF at a mate face 26, 28 is defined as a difference in elevation between a point 72 of maximum elevation and a point 72 of minimum elevation at the mate face 26, 28, in relation to the nominal surface 60. In accordance with one embodiment, the maximum variation in elevation ΔMF at any of the mate faces 26, 28 lies in the range 15-60% ΔEW. In some embodiments, the maximum variation in elevation ΔMF at any of the mate faces 26, 28 may lie in the range 30-45% ΔEW. The above constraints may be incorporated into a computerized model utilizing, for example, a spline function, or a sine functions, among others, to generate a three-dimensional shape of the endwall 40.

While specific embodiments have been described in detail, those with ordinary skill in the art will appreciate that various modifications and alternative to those details could be developed in light of the overall teachings of the disclosure. Accordingly, the particular arrangements disclosed are meant to be illustrative only and not limiting as to the scope of the invention, which is to be given the full breadth of the appended claims, and any and all equivalents thereof.

The invention claimed is:

1. A turbine stage comprising:
   a first airfoil extending from a first platform and a second airfoil spaced circumferentially from the first airfoil and extending from a second platform,
   wherein a flow passage of a working medium is defined between the first and second airfoils, the first and second platforms defining an endwall for said flow passage,
   wherein the first and second platforms comprise respective mate faces that interface along a platform splitline,
   wherein the endwall has a nominal surface that is axisymmetric about an axis of the turbine stage, the endwall further comprising at least one contoured region that is non-axisymmetric with respect to said axis, the at least one contoured region extending from the first platform to the second platform across the platform splitline,
   wherein a global maximum variation in elevation ΔEW of the endwall is at least 3% of an axial chord length L of the airfoils on said endwall,
   wherein a maximum variation in elevation ΔMF at any of said mate faces lies in the range 30-45% ΔEW,
   wherein the at least one contoured region comprises a first region comprising a bulge and a second region comprising a depression,
   wherein the global maximum variation in elevation ΔEW of the endwall is defined as a difference in elevation between a peak of the bulge and a depth d of a bottom point of the depression in relation to the nominal surface,
   wherein the bulge is along a pressure side surface on a leading edge of one of the first and second airfoils,
   wherein the depression is along a suction side surface and extends from a downstream of the bulge in the flow passage toward a trailing edge of the one of the first and second airfoils, and
   wherein the depression and the bulge do not overlap in a plane perpendicular to the axial direction.

2. The turbine stage according to claim 1, wherein the global maximum variation in elevation ΔEW of the endwall is at least 5% of the axial chord length L of the airfoils on said endwall.

3. The turbine stage according to claim 1,
   wherein the airfoils belong to a row of rotating blades, and
   wherein the endwall is an inner endwall located at the hub side of the airfoils.

4. The turbine stage according to claim 1,
   wherein the airfoils belong to a row of stationary vanes, and
   wherein the endwall is an inner endwall located at the hub side of the airfoils.

5. The turbine stage according to claim 1,
   wherein the airfoils belong to a row of stationary vanes, and
   wherein the endwall is an outer endwall located at the tip side of the airfoils.

* * * * *